Dec. 17, 1968   B. E. SHLESINGER, JR   3,417,195
STRIP AND NONSTRIP ELECTRICAL CONNECTION
Filed March 6, 1968   4 Sheets-Sheet 1

INVENTOR
Bernard Edward Shlesinger Jr.

INVENTOR
Bernard Edward Shlesinger Jr

INVENTOR
Bernard Edward Shlesinger Jr

United States Patent Office 3,417,195
Patented Dec. 17, 1968

3,417,195
STRIP AND NONSTRIP ELECTRICAL
CONNECTION
Bernard Edward Shlesinger, Jr., Annandale, Va.,
assignor to AMP Incorporated, Harrisburg, Pa.
Continuation-in-part of application Ser. No. 556,112,
June 8, 1966. This application Mar. 6, 1968, Ser.
No. 710,873
33 Claims. (Cl. 174—84)

ABSTRACT OF THE DISCLOSURE

The combination of an electrical connection including a connector receptacle having a pair of insulated conductors sealed in the receptacle and each having a conductive end face; and, a flowable conductive material in the receptacle in contact with the end faces, and the receptacle having permanently, radially contracted, crimped, sealing, clamping and positive positioning means for preventing pull-out of the conductors; and a packaged insert for said flowable conductive material having an inert material in association with the conductive material.

HISTORICAL BACKGROUND OBJECT AND SUMMARY

This invention pertains to connectors for wire, cable, or the like and more specifically to sleeve-type connectors for insulated cable that has not been stripped for connection and is a continuation-in-part of by application Ser. No. 556,112, filed June 8, 1966, now abandoned.

In development of connectors, use has been made principally of a solid connection such as a crimp connection or a soldered connection. In the case of solder or crimp connections, insulated wire or able for the most part must be stripped in order to make a good connection. In the case of some crimp connections, stripping is unnecessary due to the piercing effect of some types of crimp connectors. Piercing does not always produce a positive connection and frequently the conductor is cut through during the crimping operation thus destroying the connection. Furthermore, crimping sometimes weakens the conductor and during vibrational stresses and the like, the conductor breaks causing a fault in the circuit.

It is an object of this invention to provide a connector which will reduce breakage of the conductor.

It is further an object of this invention to provide a connector which does not require stripping of the conductors.

It is a further object of this invention to provide a connector which can be manufactured inexpensively on a mass-production basis.

Yet another object of this invention is to produce a connector which will provide a good connection between non-stripped conductors and one which will maintain this connection for a long period of time without malfunction.

Still another object of this invention is to produce a connector which can easily be installed with a minimum amount of effort by the installer and minimum time in instructing the installer as to the use and operation.

Yet another object of this invention is to provide a connector which man be manufactured from readily available and inexpensive materials.

Another object of this invention is to provide a connector which forms with the conductors a sealed unit waterproofed and airtight.

A further object of this invention is to provide a connector which utilizes such materials as sodium, potassium, lithium, mercury, germanium, gallium, and their alloys as well as conductive natural and synthetic resins.

Another object of this invention is to provide a connector and a sealed capsule having an active metal therein with means for rupturing the capsule when the connector is applied.

Yet another object of this invention is to provide a sealed connector and adapter means for the ends of the conductors to be connected for piercing a capsule of active conductive material in order to make a connection therebetween.

SUMMARY

In summary, this invention relates more specifically to the utilization of a connector having within it a flowable conductive material which will make connection between two conductors when pressure is applied to the outside surface of the sleeve thereby forcing the conductive material against the conductor in the insulated wire or cable.

The use of heat or ultrasonic waves or the like may further be used to set the material contemplated by this invention which would include metals, their alloys, or plastics which are generally in a semifluid or fluid state prior to connection. Such materials which will amalgam and harden or which will set in the nature of thermosetting or thermoplastic resins having conductive fillers therein are contemplated by this invention. Such metals as sodium, potassium, lithium, mercury, and germanium, gallium and their alloys are typical. Natural and synthetic resins including rubbers, acrylates, epoxies, and the like having conductive fillers therein and other similar type resins are typical of the type compositions of plastic which may be used. It is contemplated that in some instances the resin itself may not set but may retain its original semiplastic consistency and be maintained under pressure at all times to make a positive connection. Such a technique would also be utilized in the case of certain metals or their alloys.

These and other objects of this invention will be apparent from the following description and claims.

In the accompanying drawings which illustrate by way of example various embodiments of this invention:

FIGURE 3 shows the connector and FIGURE 4 shows the entire assembly;

FIGURES 1 THROUGH 4

Figure 1:
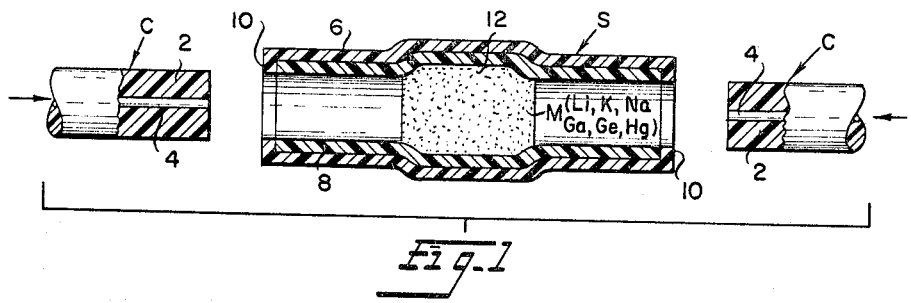
FIGURE 1 is a cross sectional view of the connector showing conductors about to be inserted therein and portions of the conductors being shown in section.

In FIGURE 1, the cable or wire C includes insulation 2 and a conductor element 4. The connector S as illustrated in FIGURES 1 through 4 comprises a sleeve 6 which may be of metal, plastic, or other material which may be compressed or otherwise shrunk or deformed. In the case of a metal sleeve, an insulating material 8 would be coated on the inside thereof. If the sleeve 6 were plastic, the insulated coating would be unnecessary. Where the metal sleeve 6 would be exposed to the elements, it might be advisable to have an additional coating on the outside thereof (not shown). The sleeve 6 is provided with gripping flanges 10 at either end thereof for purposes hereafter described. Within the sleeve 6, and in a central area which may be an annular bead or ribbed area 12 as illustrated in FIGURE 1, is located a flowable conductive material M such as a conductive plastic, or a conductive metal such as sodium, potassium, lithium, mercury, gallium, germanium, or their alloys. Various types of conductive plastics include high percentages of carbon for conductive purposes. The conductive material may be injected or otherwise positioned in the connector S by automatic machinery or the like.

Figure 2:
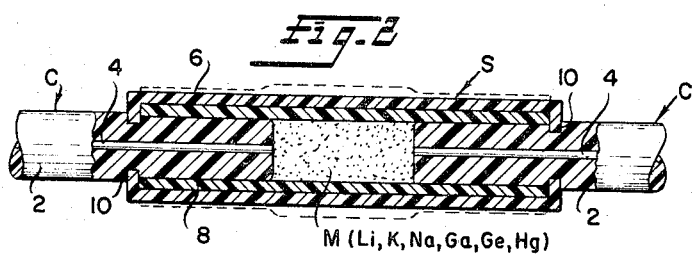
FIGURE 2 shows the connector of FIGURE 1 as applied to the conductors with portions of the assembly shown in cross section.

In FIGURE 2, the conductors C are shown positioned within the connector S which has been deformed and reduced in size from the dotted lines as illustrated in FIGURE 2. The flanges 10 now bite into the insulation 2 of the conductors C to maintain and lock the conductors in the sleeve. Due to the reduction in size which can be accomplished by means of a deforming tool or machine, the flowable conductive material M flows up against and abuts the conductors 4 to bridge the gap therebetween and close the circuit. Since the crimping or compressing operation puts the material M under pressure, a good and lasting contact is made. If the flowable conductive material M is such which will amalgamate with the conductor 4 and subsequently harden, a strong bond is established between the conductive material M and the conductor 4 which will not be disrupted under normal usage. Where the resin composition of the flowable conductive material M is such which will set and solidify with time or by the application of heat, a strong and permanent bond is made between the two conductors C. It will be obvious that several ribs may be formed by the crimping tool to further clamp the insulation material and prevent the conductor C from being stripped from the connector S.

Figure 3:
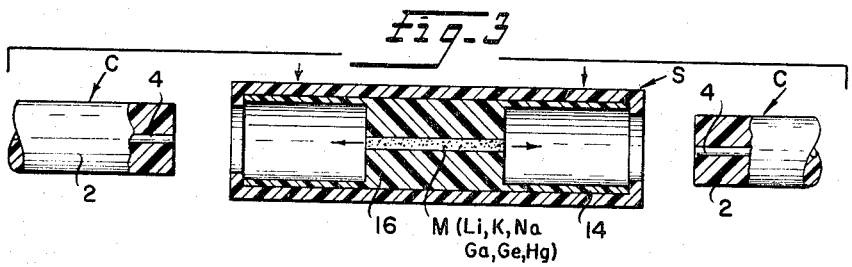
FIGURE 3 and FIGURE 4 are cross sectional views showing further embodiments of this invention.

In FIGURE 3, an insert 14 in the connector S tends to align the conductive materal and maintain the diameter of the conductive material to the approximate diameter of the conductor such as 4 in the case of FIGURE 1. The insert 14 would be in restricted area 16 and upon compression, as illustrated by the arrows, will cause the conductive material M to flow outwardly toward the wire or cable C and into contact with the conductor 4.

Figure 4:
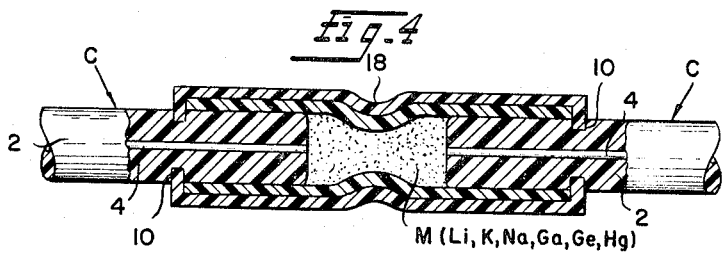

In FIGURE 4, the connector S is shown positioned on the cable or wires C and the flowable material M is maintained under compression by means of the deformation recess 18 which has been formed by a crimping tool or the like.

FIGURES 5 AND 5A

Figure 5:
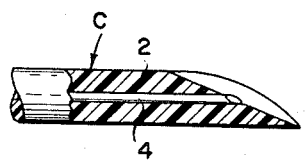
FIGURE 5 and FIGURE 5A show cross sectional views of modifications of the conductor.
Figure 5A:
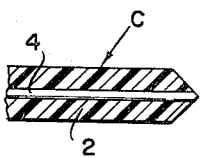

FIGURES 5 and 5A show the cables or wires C with the ends cut on a bias as in the case of FIGURE 5 or beveled to a point as in the case of FIGURE 5A. The reason for cutting the wires in the configuration shown in FIGURES 5 and 5A is to expose a greater conductor area for the purposes of making a better contact when the cable or wire is inserted into the connector S. More bonding area is available and a better piercing point is provided so that the end of the cable when pushed into the sleeve S will actually penetrate and imbed itself into the flowable conductive material prior to the crimping or reducing in size of the connector.

FIGURES 6 AND 7

Figure 6:
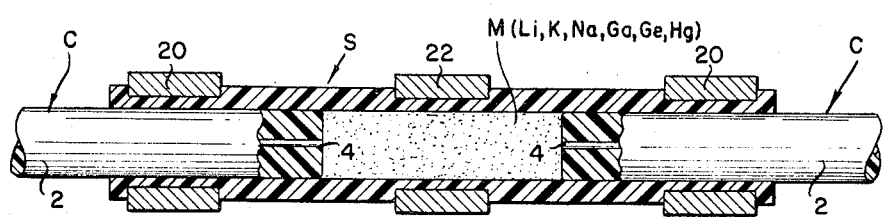
FIGURE 6 is a cross sectional view of an entire assembly showing yet a further embodiment of this invention.

In the modification in FIGURE 6, the conductors 4 of the wires C are inserted into the connector S in abutting relationship with the flowable conductive material M. The connector S is provided at either end with crimp rings 20. A third crimp ring 22 is centrally located of the connector sleeve S. In this figure, the sleeve S may be of a plastic material and the crimp rings 20 and 22 will be of metal such as aluminum or steel. When a crimping force is applied to the rings 20, the diameter of the sleeve S is reduced and clamps in the area of the rings about the cable C to prevent its being withdrawn from the sleeve S. Since the metal of the rings 20 will relax very slightly from their crimped position, a firm grip will be maintained at all times on the cable or wire C. Upon crimping of the rings 20, ring 22 is subsequently crimped in order to compress and cause the material M to flow and abut the ends of the wires or cables C thus making positive contact. In this instance, a continuous deformable sleeve is unnecessary as would be the case in FIGURES 1 and 2 for example.

Figure 7:
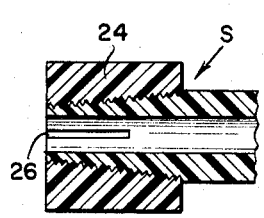
FIGURE 7 is a fragmentary cross sectional view of yet another embodiment of the connector.

FIGURE 7 which shows the end of the sleeve S is provided with a threaded tapered wedge 24. The ends of the connector S are threaded and provided with a taper corresponding to the tapered sleeve or clamping nut 24. Slots 26 may be provided to permit ease in threading of the nut 24 on a sleeve S. The nuts 24 may be polygonal so that a wrench or similar tool may be used to tighten the nuts and thereby clamp the cable in the sleeve S. Where the sleeve S is plastic, it will be unnecessary to provide slots 26.

FIGURES 8 THROUGH 12

Figure 8:
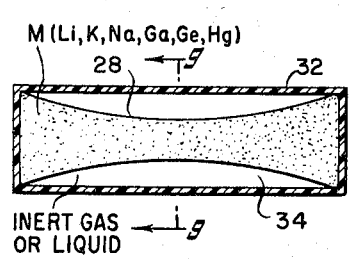
FIGURE 8 is a cross sectional view showing a packaged insert as taught by this invention.
Figure 9:
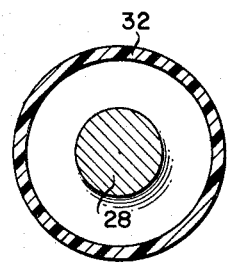
FIGURE 9 is a cross sectional view taken along the lines 9—9 in FIGURE 8 and viewed in the direction of the arrows.

In instances where the composition may be highly oxidative for example sodium, potassium, and lithium, the metals or their alloys must be protected by an inert material to avoid oxidation. A hydrocarbon liquid or an inert gas may be utilized. FIGURE 8 shows an insert in which the metal of the deformable material M is shaped in cylindrical fashion having a reduced central diameter. It will be seen that the central portion 28 is considerably smaller in diameter than the end portions 30. The flowable conductive material M is wrapped or encapsuled by means of a wrapper 32 so as to provide an annular pocket 34 in which the inert liquid or gas is trapped for preservation and stabilizing of the active metal. The wrapper may be foil or plastic or the like.

Figure 10:
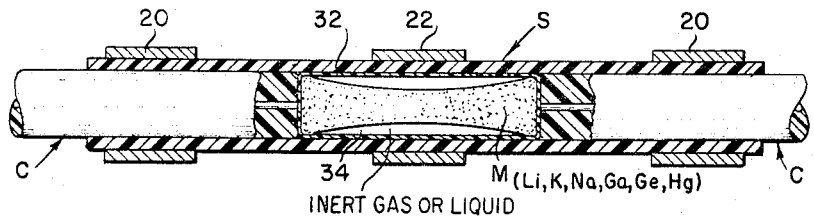
FIGURE 10 is a cross sectional view of an assembly showing still another modification of this invention prior to crimping.
Figure 11:
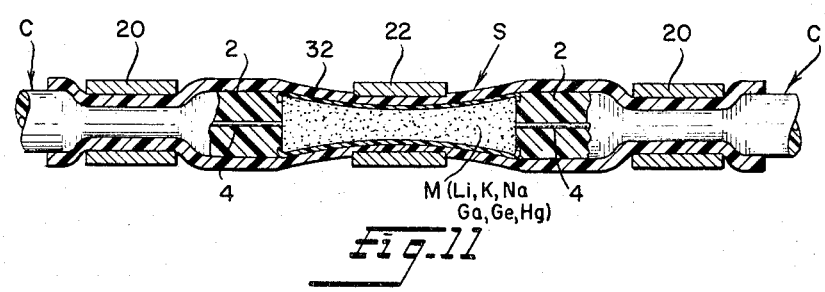
FIGURE 11 is the assembly shown in FIGURE 10 subsequent to crimping.
Figure 12:
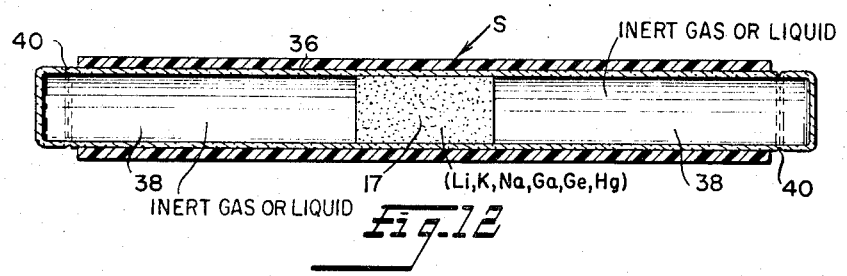
FIGURE 12 is yet another embodiment of an insert as taught by this invention shown in cross section.

FIGURES 10 and 11 show the flowable conductive material packaged and inserted in the connector S. FIGURE 10 shows the packaged insert prior to compression of the rings 20 and 22. The plastic wrapper or the like 34 is still in position maintaining the oxidated material M in an inert environment. FIGURE 11 shows the crimp rings 20 and 22 after crimping and the clamping action on the wires C and on the flowable conductive material M by the clamp rings 20 and 22. It is noted that upon clamping of the clamp ring 22, the envelope or cover wrapper is ruptured at the ends permitting the material to flow and make positive contact with the conductors 4 of the wire or cables C. The gas in the envelope or capsule or the liquid as the case may be, is displaced by the crimping action and relocated in an area not interfacing with the actual electrical connection.

FIGURES 13 AND 14

Figure 13:
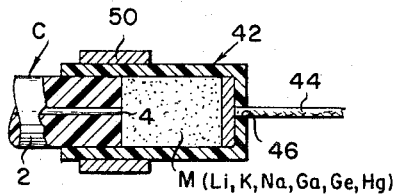
FIGURES 13 and 14 are still further embodiments of this invention showing various assemblies in cross section.
Figure 14:
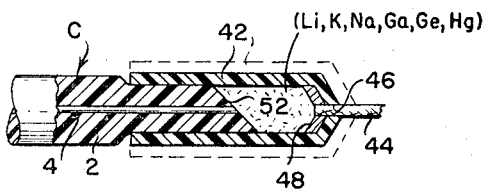

FIGURES 13 and 14 show adapters generally indicated at 42 having a nail-type conductor 44 extending out through an opening 46 in the rear of the adapter 42. A button 48 contacts the flowable material M. In FIGURE 13, the cable C is inserted and the compression ring 50 secures the cable within the adapter 42 and simultaneously compresses the conductive material M to make contact between the conductor 44 and the conductor 4. In FIGURE 14, the end of the cable C is beveled as at 52 and the adapter 42 is heat-shrunk onto the cable C thereby applying pressure to the conductive material M in order to make positive contact between the conductor 44 and the conductor 4.

FIGURE 15

Figure 15:
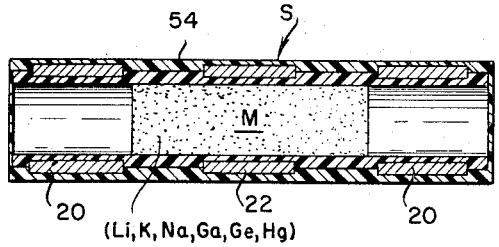
FIGURE 15 is a cross sectional view illustrating yet a further embodiment of the packaged connector.

In FIGURE 15, the sleeve S, is encapsulated by a membrane of packaging material such as foil or plastic 54. The plastic material covers the rings 20 and 22 to maintain the entire connector in clean condition prior to use. When the connector is used, the ends are pierced by the cables C or by some other means and the cables are forced to engagement with the conductive material M. Application of crimping forces to the rings 20 and 22 in the manner heretofore described complete the electrical connection.

FIGURES 16 THROUGH 18

Figure 16:
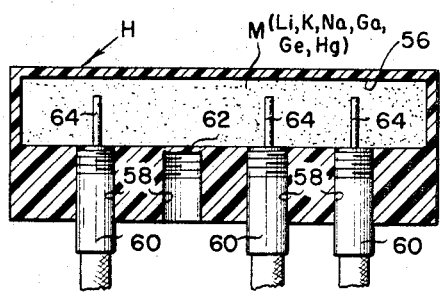
FIGURE 16 is a cross sectional view illustrating a multiple connector as taught by this invention.
Figure 17:
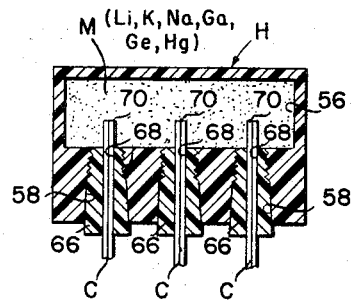
FIGURE 17 is a cross sectional view illustrating yet another embodiment of the packaged connector.
Figure 18:
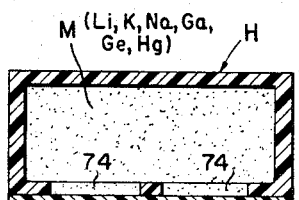
FIGURE 18 is a cross sectional view of the receptacle of FIGURE 17 but without the conductor inserts.

FIGURES 16 through 18 show a multiple housing H having a chamber 56 for receiving the conductive material M. A series of ports 58 open into the chamber 56. The ports are threaded for the receipt of jacks 60. The ports 58 are closed off by a sealing member 62. When a jack 60 is inserted into the openings 58, the seal member 62 is perforated and the end 64 of the jack 60 comes into contact with the conductive flowable material M. Any number of openings 58 for receipt of the jacks 60 can be provided as desired.

FIGURE 17 is modified only slightly and includes the openings 58. Conical shaped buttons 66 having openings 68 for receiving the conductor 70 are provided. The buttons 66 may operate in the same manner as the nut 24 in FIGURE 7 and may be split or not as desired. When the wires C are inserted in the opening in the buttons 66, and the buttons are forced into the housing H, the wires come into contact with the conductive material in the chamber 66 and produce a proper contact.

FIGURE 18 merely shows the housing similar to that in FIGURE 17 and the seal membrane 72 covering the openings 74. The conductive material is packaged in the housing H and maintained in a sealed relationship in the housing until such time as the membrane of the sealing material 72 is pierced.

FIGURES 19 THROUGH 21

Figure 19:
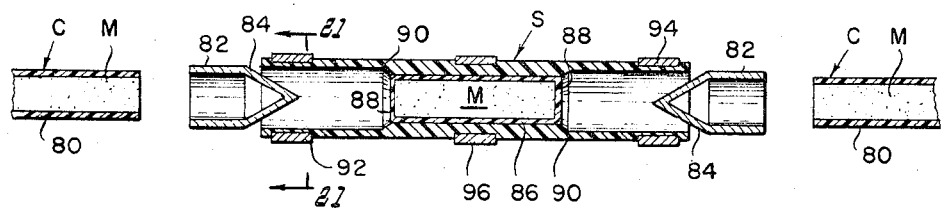
FIGURE 19 is an exploded view shown in cross section of the sleeve coupling and the conductors.

In FIGURE 19, the conductors C are provided with insulated sheaving 80. The conductors C have conductive material M such as sodium or the materials aforementioned. For heavy loads, the material M may be an inch or more in diameter. Since the material in some instances may be highly reactive to moisture and the like, a good seal with the connector sleeve S is essential. A pair of caps 82 are provided which slip over the ends of the conductors C. The caps are provided with lancing means 84. Any suitable lancing 84 may be provided at the end of the cap 23 in order to properly pierce the capsule or container 86 which holds the active conductive material M, sealed from moisture or the like. Once the end walls 88 of the capsule 86 are lanced or pierced, the material M in the capsule will, as will be hereinafter described, flow and become merged with the material M in the conductors C. The lance portion 84 of the caps 82 may be of a conductive material but preferably of a material which will not produce a violent chemical reaction with the material M in the conductors 80 or in the capsule 86. Making the lancing means 84 of conductive material will insure proper conductivity upon connection of the coupling sleeve S.

The sleeve S is provided with shoulders 90 which limit the travel of the caps 82 in the sleeve S. Once the conductors C have been inserted with their caps 82 into the sleeve S, compression rings 92 and 94 will first be crimped to lock the conductors C in sealed relation with the sleeve S. The sleeve will be of a nonconductive material such as nylon or the like. After the rings 92 and 94 have been compressed, a certain amount of squirting of the material M in the conductors C will occur in the direction of the material M in the capsule 86. Since the lancing or piercing means will allow for flow of the material M in the capsule 86 in the direction of the material in the conductors C, a good connection will under normal circumstances be made. Nevertheless, to further insure and maintain a constant pressure in the sleeve S, ring 96 will then be compressed to further strip the end walls 88 of the capsule 86 to permit better commingling of the material in the capsule 86 with the material in the conductors C.

For underground electrical conduits, a good seal will have been afforded by the connection and because of the special crimping procedure utilizing the ring 96, a good electrical connection will be assured.

FIGURES 22 THROUGH 24

Figures 20, 21:
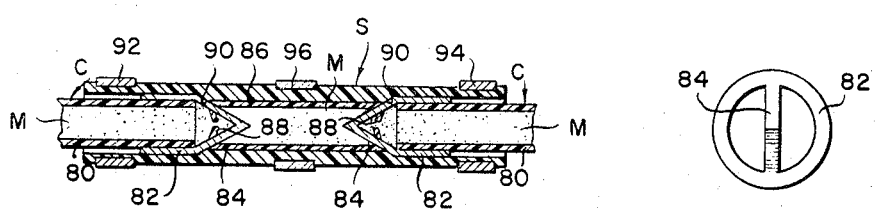
FIGURE 20 is a cross sectional view of the conductors and the sleeve in assembled relation prior to crimping of the crimp rings.
FIGURE 21 is a top plan view taken along the lines 21—21 of FIGURE 19 and viewed in the direction of the arrows.
Figures 22, 23:
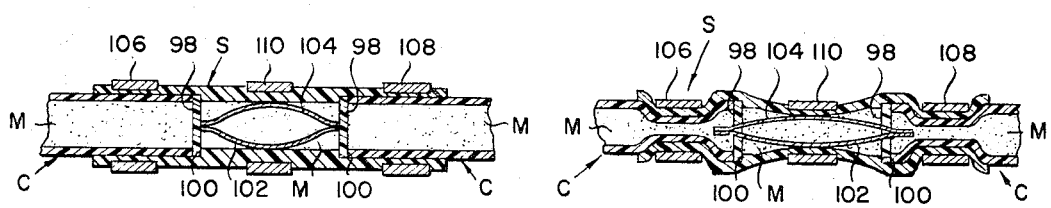
FIGURE 22 is a cross sectional view of another modification of the invention with the conductors inserted and prior to crimping of the sleeves.
FIGURE 23 is a cross sectional view of the invention illustrated in FIGURE 22 after crimping operation.

In FIGURE 22, the conductors C are shown inserted into the sleeve S. The sleeve S is provided with conductive flowable material M such as sodium or the like, which is maintained in a sealed relation by means of gaskets 98. The gaskets 98 are pierceable and/or fragible or the like. Shoulders 100 in the sleeve S are provided to aid in positioning of the gaskets 92. Mounted within the sleeve S is an elliptical spring conductive member 102. The ends 104 of the spring conductor 102 act in the same manner as the lancing means 84 in FIGURES 19 through 21. Compression rings 106, 108 and 110 are provided on the sleeve S.

FIGURE 23 shows the connection after the crimping rings 106 and 108 and subsequently 110 are crimped. It will be noted that the crimping of the ring 110 subsequent to the crimping of the rings 106 and 108 reduces the width of the conductor spring 102 elongating it so that the piercing ends 104 will pierce the gaskets 98 or otherwise destroy them so as to permit the material M within the sleeve S to flow in the direction of the material M in the conductors C. The conductive nature of the conductor 102 guarantees proper electrical connection.

Figure 24:
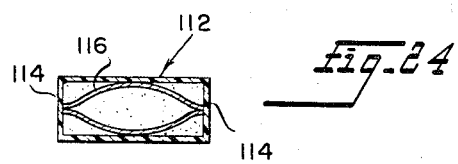
FIGURE 24 is a cross sectional view of a capsule having the lancing means enclosed therein.

FIGURE 24 shows a capsule 112 having end walls 114 which will be pierced by the elliptical spring conductor member 116. The insert or capsule 112 can be positioned at any time within the sleeve capsule S, eliminating the necessity of the gaskets 98. It is obvious that the entire connector in FIGURE 22 would be preassembled whereas this would be unnecessary if the capsule 112 in FIGURE 24 is used as the capsule may be subsequently inserted into the sleeve S and just before connection.

In conclusion, it should be noted that certain conductive chemical copositions may be hardened or set by use of supersonic or ultrasonic waves in addition to utilizing heat for shrinking or setting or both. These processes are contemplated by this invention.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

Having thus described my invention, what I claim is:

1. In combination, an electrical connection including:
   (a) a connector sleeve,
   (b) a pair of insulated conductors disposed in said sleeve and each having a conductive end face,
   (c) a flowable conductive material in said sleeve in contact with said end faces,
   (d) said flowable conductive material being selected from the group consisting of: sodium, lithium potassium, mercury, germanium, and alloys thereof,
   (e) said sleeve being permanently crimped into sealing and clamping engagement with said insulated conductors, and
   (f) means maintaining compressive force on said flowable conductive material.

2. In combination, an electrical connection as in claim 1, and wherein:
   (a) said end faces are cut on a bias.

3. In combination, an electrical connection as in claim 1, and wherein:
   (a) said connector sleeve includes at least one compression ring.

4. In combination, an electrical connection as in claim 3, and wherein:
   (a) said compression ring is imbedded in said connector sleeve.

5. In combination, an electrical connection as in claim 1 and including:
   (a) an insulated liner in said connector sleeve.

6. In combination, an electrical connection as in claim 1 and wherein:
   (a) said conductors are insulated to their end faces and exposed only at their end faces.

7. In combination, an electrical connection as in claim 1 and wherein:
   (a) said means for maintaining said compressive force is a crimped ring positioned about said flowable conductive material.

8. In combination an electrical connection as in claim 1 and including:
   (a) a cap on the end of each of said conductors, and
   (b) said caps having conductive means inserted into said flowable conductive material in said sleeve.

9. In combination, an electrical connection as in claim 8 and wherein:
   (a) said means for maintaining compressive force on said flowable conductive material in said sleeve is positioned behind said caps.

10. In combination an electrical connection as in claim 1 and wherein:
    (a) said flowable conductive material in said sleeve is encapsulated,
    (b) said combination including caps on the ends of each of said conductors, and
    (c) said caps having means piercing said capsule and inserted into said encapsulated material in said sleeve.

11. In combination, an electrical connection as in claim 10, and wherein:
    (a) said means for maintaining compressive force on said flowable conductive material in said sleeve is positioned behind said caps.

12. In combination, an electrical connection as in claim 1 and including:
    (a) sealing means for said flowable conductive material in said sleeve, and
    (b) means rupturing said sealing means.

13. In combination, an electrical connection as in claim 12 and wherein:
    (a) said means rupturing said sealing means is positioned centrally of said sleeve.

14. In combination, an electrical connection as in claim 12 and wherein:
    (a) said means rupturing said sealing means includes a pair of separate disconnected lances.

15. In combination, an electrical connection as in claim 12 and wherein:
    (a) said means rupturing said sealing means in said sleeve includes a pair of interconnected lances.

16. In combination, an electrical connection as in claim 12, and wherein:
    (a) said means rupturing said sealing means in said sleeve includes a member longitudinally-elongated and laterally constricted.

17. In combination, an electrical connection as in claim 16 and wherein:
    (a) said means rupturing said sealing means includes an elliptical member.

18. In combination, an electrical connection as in claim 12, and wherein:
    (a) said means rupturing said sealing means is primarily positioned within said flowable conductive material in said sleeve.

19. In combination, an electrical connection as in claim 12 and wherein:
    (a) said means rupturing said sealing means is positioned adjacent the ends of said conductors.

20. In combination, an electrical connection including:
    (a) a connector sleeve,
    (b) a pair of insulated conductors disposed in said sleeve and each having a conductive end face,
    (c) a flowable conductive material in said sleeve in contact with said end faces,
    (d) said flowable conductive material being a conductive resin composition,
    (e) said sleeve being permanently crimped into sealing and clamping engagement with said insulated conductors, and
    (f) means maintaining compressive force on said flowable conductive material.

21. In combination, an electrical connection including:
    (a) a connector sleeve,
    (b) a pair of insulated conductors disposed in said sleeve and each having a conductive end face,
    (c) a flowable conductive material in said sleeve in contact with said end faces,
    (d) said flowable conductive material being selected from the group consisting of: sodium, lithium, and potassium, and alloys thereof,
    (e) said sleeve being permanently crimped into sealing and clamping engagement with said insulated conductors,
    (f) means maintaining compressive force on said flowable conductive material, and
    (g) an inert stabilizer in said sleeve in contact with said flowable material.

22. In combination, an electrical connection as in claim 21, and wherein:
    (a) said stabilizer is an inert liquid.

23. In combination, an electrical connection as in claim 21, and wherein:
    (a) said stabilizer is an inert gas.

24. A packaged insert for electrical connectors including:
    (a) a rupturable receptacle having sealed closed ends,
    (b) flowable conductive material positioned in said receptacle,
    (c) an inert gas for preserving said flowable conductive material,
    (d) said flowable conductive material having an annular recessed area, and
    (e) said gas being a barrier between said flowable conductive material and said receptacle in said annular recessed area.

25. A package conductive insert for electrical connectors, as in claim 24 and wherein:
   (a) said flowable conductive material is selected from the group consisting of: sodium, lithium, potassium and alloys thereof.

26. A packaged insert for electrical connectors including:
   (a) a rupturable receptacle having sealed closed ends,
   (b) flowable conductive material positioned in said receptable,
   (c) an inert liquid for preserving said flowable conductive material,
   (d) said flowable conductive material having an annular recessed area, and
   (e) said liquid being a barrier between said flowable conductive material and said receptacle in said annular recessed area.

27. A package conductive insert for electrical connectors as in claim 26, and wherein:
   (a) said flowable conductive material is selected from the group consisting of: sodium, lithium, potassium and alloys thereof.

28. A packaged insert for electrical connectors including:
   (a) a substantially cylindrical rupturable receptacle having sealed closed ends,
   (b) flowable conductive material positioned in said receptacle,
   (c) an inert material in said flowable conductive material,
   (d) said inert material being generally located in pockets at opposite ends of said receptacle, and
   (e) said pockets being separated from each other by said flowable conductive material.

29. A package conductive insert for electrical connectors as in claim 28, and wherein:
   (a) said flowable conductive material is selected from the group consisting of: sodium, lithium, potassium, and alloys thereof.

30. A packaged insert for electrical connectors including:
   (a) a rupturable receptacle having sealed closed ends,
   (b) flowable conductive material positioned in said receptacle, and
   (c) means within said receptacle having lancing means for rupturing said receptacle upon compression of said receptacle.

31. A packaged conductive insert as in claim 30 and wherein:
   (a) said means for rupturing is elliptical in configuration.

32. A packaged conductive insert as in claim 30 and wherein:
   (a) said means for rupturing is conductive.

33. A packaged conductive insert as in claim 30 and wherein:
   (a) said flowable conductive material is selected from the group consisting of: sodium, lithium, potassium and alloys thereof.

References Cited

UNITED STATES PATENTS 3,254,322  5/1966  Graeff _____ 174—84 XR

OTHER REFERENCES

Hyde: Abstract of application Ser. No. 206,902, published May 20, 1952; 658 O.G. 918.

DARRELL L. CLAY, *Primary Examiner.*

U.S. Cl. X.R.

206—46; 174—87, 75; 339—95, 118, 276; 29—628